(12) United States Patent
Law

(10) Patent No.: US 8,167,085 B2
(45) Date of Patent: May 1, 2012

(54) NON-COMBUSTIBLE SOUND-ABSORBING FACING

(75) Inventor: Harvey Hui-Xiong Law, Balwyn North (AU)

(73) Assignee: SMC Australia Pty Ltd, Victoria (AU)

( * ) Notice: Subject to any disclaimer, the term of this patent is extended or adjusted under 35 U.S.C. 154(b) by 0 days.

(21) Appl. No.: 12/537,968

(22) Filed: Aug. 7, 2009

(65) Prior Publication Data

US 2011/0031064 A1    Feb. 10, 2011

(51) Int. Cl.
*E04B 1/88* (2006.01)
*E04B 1/84* (2006.01)
*E04B 1/82* (2006.01)
*E04B 1/74* (2006.01)

(52) U.S. Cl. ............ 181/286; 181/294; 181/290

(58) Field of Classification Search ......... 181/286, 181/294, 290, 291, 284
See application file for complete search history.

(56) References Cited

U.S. PATENT DOCUMENTS

| | | | | |
|---|---|---|---|---|
| 3,286,785 A * | 11/1966 | Shannon et al. | ............. | 181/292 |
| 3,783,969 A * | 1/1974 | Pall | ............. | 181/286 |
| 3,977,492 A | 8/1976 | Hankel | | |
| 4,147,578 A * | 4/1979 | Koss | ............. | 156/245 |
| 4,420,526 A * | 12/1983 | Schilling et al. | ............. | 428/171 |
| 4,584,232 A | 4/1986 | Frank et al. | | |
| 4,828,932 A * | 5/1989 | Morimoto et al. | ............. | 428/608 |
| 4,990,407 A * | 2/1991 | Watras | ............. | 428/426 |
| RE34,020 E * | 8/1992 | Briggs et al. | ............. | 428/198 |
| 5,185,197 A * | 2/1993 | Nixon | ............. | 428/196 |
| 5,459,291 A | 10/1995 | Haines et al. | | |
| 5,661,273 A * | 8/1997 | Bergiadis | ............. | 181/290 |
| 5,824,973 A | 10/1998 | Haines et al. | | |
| 6,490,828 B1 * | 12/2002 | Fuller et al. | ............. | 52/36.1 |
| 6,720,068 B1 | 4/2004 | Vanbemmel et al. | | |
| 6,855,393 B1 * | 2/2005 | Ayres | ............. | 428/116 |
| 7,137,477 B2 * | 11/2006 | Keller et al. | ............. | 181/286 |
| 7,503,428 B1 * | 3/2009 | Johnson | ............. | 181/290 |
| 2002/0004127 A1 * | 1/2002 | Bowman et al. | ............. | 428/296.7 |
| 2003/0175497 A1 * | 9/2003 | Kobe et al. | ............. | 428/317.9 |
| 2004/0180592 A1 * | 9/2004 | Ray | ............. | 442/38 |
| 2004/0231915 A1 | 11/2004 | Thompson, Jr. et al. | | |
| 2005/0142359 A1 * | 6/2005 | Narum et al. | ............. | 428/343 |
| 2006/0289231 A1 * | 12/2006 | Priebe et al. | ............. | 181/290 |
| 2007/0151800 A1 * | 7/2007 | Olson et al. | ............. | 181/286 |
| 2007/0272285 A1 * | 11/2007 | Herreman et al. | ............. | 134/58 D |
| 2007/0287346 A1 | 12/2007 | Tisseyre et al. | | |
| 2008/0001431 A1 * | 1/2008 | Thompson et al. | ...... | 296/187.01 |
| 2008/0050565 A1 * | 2/2008 | Gross et al. | ............. | 428/212 |
| 2010/0101891 A1 * | 4/2010 | Kamikawa | ............. | 181/290 |

FOREIGN PATENT DOCUMENTS

WO    WO/2006/007275    1/2006
WO    WO/2006/007276    1/2006

OTHER PUBLICATIONS www.megasorber.com web site; printout of web pages (80 pages), web site published by SMC Australia Pty Ltd (trading as Megasorber) on web on Aug. 8, 2008.

* cited by examiner

*Primary Examiner* — Edgardo San Martin
(74) *Attorney, Agent, or Firm* — Greenlee Sullivan P.C.

(57) ABSTRACT

The present invention relates to a non-combustible, sound-absorbing facing (30) having an air flow resistivity of between 80 and 3,000 Rayls and a weight per unit area of between 20 and 1,000 g/m² and to a laminate (10) comprising the facing (30) and a substrate (20) wherein superimposing the facing (30) on the substrate (20) forms the laminate (10) having good sound absorbing characteristics.

27 Claims, 5 Drawing Sheets

NON-COMBUSTIBLE SOUND-ABSORBING FACING

FIELD OF INVENTION

The present invention relates to a non-combustible, sound-absorbing facing and to a laminate comprising the facing.

BACKGROUND OF THE INVENTION

Sound-absorbing materials are typically made of inefficient and/or hazardous materials, in particular, materials that can be readily combustible such as paper, cellulose, viscose, foam, cotton wool, polyester and the like. Other materials used which may not be as readily combustible, still have low thermostability where the degree of thermostability is governed not by the environment in which the laminate is to be used but rather by the temperature involved in the moulding process for producing the sound-absorbing laminate.

In spite of these failings, sound-absorbing materials are often employed in situations where the reduction of noise pollution is considered of greater importance than the potential for the material to become or to be rendered as a fire hazard. As a result of such short comings, sometimes a decision has to be made, when selecting a sound-absorbing material to be positioned in a fire hazard situation, as to whether the need for reduced noise pollution outweighs the potential for it to catch on fire or, if the reverse is more important. For example, when shielding noisy machinery or selecting a noise insulator to surround an automotive engine, the machine or engine oil can be sprayed onto and be absorbed by the surrounding sound-absorbing material. The resultant effect being that not only does the sound-absorbing material start to lose its sound-absorption capacity, but it becomes prone to catching alight. Should a spark hit the oil-soaked sound-absorbing material, the oil held by the material will feed/exacerbate its flammability.

SUMMARY OF THE INVENTION

According to the present invention there is provided a non-combustible sound-absorbing facing, wherein the facing has an air-flow resistance of between 80 to 3,000 Rayls and a weight per unit area of between 20 to 1,000 g/m$^2$.

The invention is also directed to a non-combustible sound-absorbing laminate which comprises the facing of the invention and a substrate upon which the facing is superimposed.

BRIEF DESCRIPTION OF DRAWINGS

Other features and advantages of one or more of the preferred embodiments of the present invention will be readily apparent to those skilled in the art from the following written description with reference to and used in conjunction with the accompanying drawings in which.

DETAILED DESCRIPTION OF THE INVENTION

Figure 1:
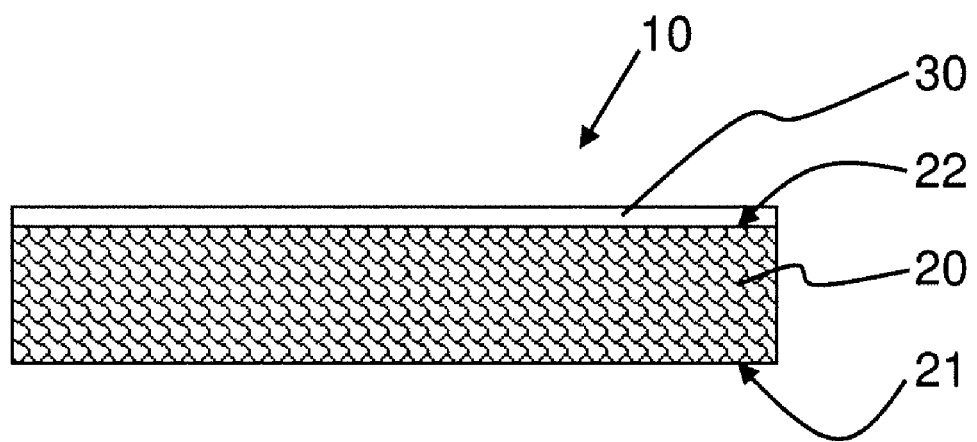
FIG. 1 is a cross-sectional view of a non-combustible sound-absorbing laminate or composite comprising the facing of the present invention and a substrate.

Preferably, the facing is a fabric or textile (hereinafter referred to as a "fabric"). More preferably the fabric is a knitted or woven fabric. The fabric is made up of a non-combustible material, the preferred non-combustible material being selected from glass, ceramic and/or rock wool, fibre, yarn; or mixtures thereof. The non-combustible material may also be treated such as by coating to increase its fire resistance. Crossing various yarns generally known as warp and weft yarn preferably forms the fabric. Such yarn can be made according to suitable processing techniques as known in the art to provide the finished product having the required air-flow resistance values. The yarn from which the fabric is manufactured can be treated to provide the additional fire rating coating prior to the manufacture of the fabric or subsequent thereto.

The thickness of the resultant facing is preferably between 0.1 and 3.0 mm and more preferably between 0.12 and 1.5 mm.

The yarn can be formed from several filaments. The weight of the yarns can vary between 20 and 120 Tex. However, the more preferred yarn weight is between 34 and 68 Tex, with a most preferred Tex of around 68. Typically, for a glass yarn, each filament has a diameter of between 6 and 9 microns, with the yarn having a diameter ranging between 3 and 500 micron. The preferred yarn diameter being between 6 and 150 micron.

While the weight of the facing can vary between 20 to 1,000 g/m2, it is preferred that the facing is light-weight, having a weight of less than 300 g/m2 and more preferably around 200 g/m2. A light-weight facing is preferred in that it is more flexible and enables it to be moulded/shaped to a required shape or to be applied to a non-planar surface, such as the underside of automotive engine hoods i.e. to be a hood liner. When used as part of a laminate and when the laminate is applied to the surface of the lining of an air duct, vehicle head-liner, in the vicinity of vehicle exhaust system and the like, the light-weight facing maintains its contact with the undulating surface of the substrate.

The selection of the facing weight is therefore dependent upon its end use. For example, a more rigid facing may be required where it will act as the exposed face of a sound-adsorbing wall upon which a picture, photograph and the like may be hung for display. Similarly, where the facing is exposed to people traffic, it may need to be tougher i.e. have increased rigidity to minimize tearing when bumped or contacted by the passing people traffic. Accordingly, the facing can be mechanically tough and also act as a durable protective layer. The facing is preferably also easy to clean, handle and cut.

If required, the facing can be partially or totally covered or overlaid by a suitably selected screen fabric or the like. It might also be coloured or an image applied directly thereto, provided such enhancements do not jeopardise the necessary air-flow resistivity of the facing to enable it to maintain its sound-absorbing properties and function.

It is also possible that the facing can be exposed to the outside environment without suffering undue degradation in its physical and sound-absorbing properties. Preferably, the facing will not, when subjected to hot and humid conditions, rot or powderize. The facing can be stretched over structures, such as metal or timber frames to make panels, banners or over cables to form, for example, sails and the like.

The facing can be affixed to a substrate thereby providing a non-combustible sound-absorbing laminate or composite. The substrate is preferably also one having sound-absorbing characteristics; however, it does not necessarily have to have such characteristics. The substrate material can therefore have little or no acoustic absorbing performance and because of the presence of the facing of the present invention, the laminate is still effective. Thus, where the substrate is more susceptible to damage or tearing through being inadvertently knocked, the presence of the tough, durable facing provides a protective and non-combustible layer to traditional acoustic materials.

DESCRIPTION OF THE PREFERRED EMBODIMENTS

In FIG. 1, the laminate 10 is comprised of a substrate 20 with a facing 30 of the present invention superimposed over it. The substrate 20 may be an acoustic foam or air-permeable material, which exhibits sound-absorbing properties. Suitable examples are open-cell foams like polyurethanes. Other air-permeable materials can be polyester fibres, glass wool or fibre, rock wool or fibre, cellulose, paper pulp, wool, cotton wool or felt, viscose and polyfelt. All these materials allow a degree of trapping of the sound waves that pass into them and they are able to dissipate some of the energy of the sound waves as heat caused by the wave travelling through the substrate material as heat given off.

Substrate 20 is not required to have the same air-flow resistivity as the facing 30 covering it. As a result of the facing 30, appropriate sound-absorbency is obtained, which is not dictated by or dependent on the substrate 20 there under.

Substrate 20 is preferably formed as a foam or pad having a thickness which may range from between about 1 to 200 mm. The facing 30 is applied to the upper face 22 of the substrate and it is the facing which is exposed towards the source of the noise and/or in the direction in which any flame or fire would be expected to come. The facing 30 does not normally enclose the substrate 20 within it. Normally, the facing is only applied to the one surface of the substrate 20.

The facing 30 is preferably affixed to the entire upper face 22 of the substrate 20. That fixing can be by mechanical means and/or thermal and/or adhesive bonding. Therefore, the facing 30 can be releasably fixed by for example, the use of appropriate attachment means to the substrate 20. Such attachment means can include the use of pins, clips, staples and/or sewing.

The facing 30 can be adhered by using compression moulding or flame lamination and the method or composition of choice may be determined by the composition of the substrate 20. For example, if the substrate 20 is made up of polyester wool, whereby the upper surface of the polyester, which is to be covered by the facing 30, is heated sufficiently to cause a partial melt of at least some of the exposed polyester fibres, whereby they become sufficiently tacky or sticky to then hold the facing 30 when applied thereon.

Figure 3:
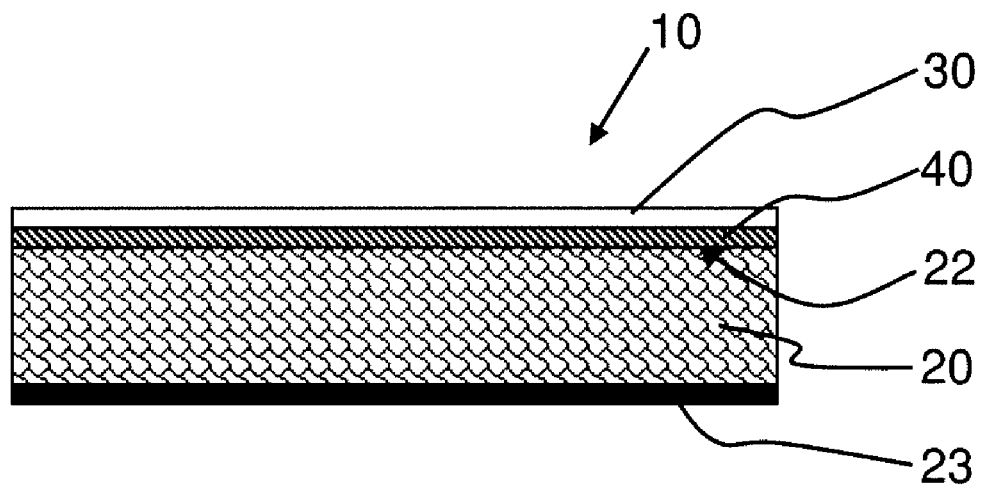
FIG. 3 is a cross-sectional view of an alternative non-combustible sound-absorbing laminate, wherein a bonding layer is located between the substrate and the facing.

In FIG. 3, the laminate 10 is comprised of a substrate 20 with an adhesive layer 40 holding facing 30 in contact therewith.

When using an adhesive bonding, a variety of thermoplastic adhesives as are known in the art may be employed. The preferred adhesives would include co-polyesters, polyamides and the like. These may be in the form of powder or web adhesives. More preferably, the adhesive selection is one that has a sufficient thermal stability in order to maintain the integrity of the bond between the facing 30 and the substrate 20 in the event of facing 30 of the laminate being exposed to a flame.

In relation to both the thermal and adhesive bonding, the degree of bonding between the facing 30 and the substrate 20 should be such that it is sufficient to hold the facing 30 in contact with the substrate 20, while not compromising the required air-flow resistivity value of the facing 30. Accordingly, it is preferred that when an adhesive it used, that it is one that is sufficiently air-permeable. A typical preferred adhesive is either powder adhesive or web adhesive, such as PA121 from Bostik. Further, adhesive layer 40 preferably has a negligible thickness.

The substrate 20 provides the predominate amount of the thickness of the laminate.

The thickness of the facing 30 may lie in the range from 0.1 to 3.0 mm. The facing is preferably of a 1×1 plain weave. The yarns making up such a weave may have a spacing of yarns/5 cm of typically 60×57.5 or 87×61. The facing can substantially prevent the substrate from soaking up fluid when splashed onto it from the facing side.

The length and width of the facing 30 will vary with the dimensions of the surface of the substrate to be covered. The facing and/or laminate are usually available in rolls of indefinite length and widths. However, it is preferred that the rolls are about 1.40 m wide and in lengths of 15, 30 or 60 metres.

The facing provides a low cost insulation material.

As with the facing, the laminate can also be handled easily and is simple to cut.

When the substrate 30 is an open cell foam, it preferably has a density of from 8 to 120 kg/m3, with a preferred range from 8 to 32 kg/m3.

The facing can withstand temperatures up to 750° C. Even after being exposed to such temperatures or flames, the facing material maintains its integrity. Fire test results using the AS/NZS 3837 procedure have been performed on the facing of the present invention and the facing is classified as Group 1 or better.

The adhesion between the facing and substrate is dependent on the composition/materials of the substrate 20 used where the substrate can be fused to the facing and/or there is an adhesive layer 40 there between. Accordingly the integrity of the bond when using an adhesive layer is dependent upon the melting temperature of the adhesive used. When the adhesion is via a polyester web adhesive like PA121 by Bostik, the laminate can withstand a maintained temperature of 120° C., such that the adhesion between the facing and the substrate is maintained.

The thickness of the substrate 20 need not be consistent along its length or width, which variation in thickness might arise for example when the underside 21 of the substrate 20 is sculptured and then applied to an uneven surface such as the underside of an engine hood. In such a situation, and it is preferred that the upper face 22 of the substrate 20 maintains a substantially flat exposed face 22 to which facing 30 is to be applied, it is found that the variation in the thickness of the substrate 20 is not substantially detrimental to the sound absorbency of the laminate, i.e. the integrity of the sound absorbency of the laminate in its thinner depths is substantially the same as at its thicker depths.

Therefore, the success of the sound absorbency of the facing 30 results in the ability to use thinner substrates while maintaining the required absorption coefficient, the overall effect of which is that the laminate 10 can have a low weight per unit area. Another advantage achieved is that the laminate can occupy less spatial area. That is, it can take up less amount of space when placed, for example within a wall cavity, whereby thinner walls can be achieved.

To the underside 21 of the substrate 20, a self-adhesive backing 23 can be applied to permit fixing of the substrate 20 onto the wall, hood, lining of the area from within which the noise pollution is being emitted.

The backing 23 is preferably a double-sided tape or sheet where that side of the tape/sheet which contacts the underside 21 of the substrate 20 is adhesively bonded thereto. The other or exposed side of the tape/sheet maintains its covering film or paper contact with the tape/sheet until it has to be removed to affix the laminate 10 to the wall, lining, hood etc. Those double-sided tapes/sheets as are used in the art can still be employed with the present invention.

As the facing can be used and is efficient by itself in reducing noise pollution, when affixed to the substrate, the thickness of the substrate is adjustable according to the requirements of the end user without any appreciable drop in the sound-absorbency of the laminate.

Through using the facing of the present invention, it has been found that it can be applied to traditional sound insulation materials and that the facing makes it possible to provide sound-absorption laminates with constant performance by removing the acoustic variation within the substrate.

Typical applications for using the facing and laminate of the present invention include acoustic wall treatments; commercial buildings, concert halls, auditoriums; recording studios; cinemas; classrooms and lecture theatres; restaurants; hotels; cafes; bars; clubs; power stations; linings for air ducts, compressors, generators, machinery, equipment, electronic, plant and electrical enclosures, wall and ceiling linings, hood and head liners for automotive vehicles; marine, aviation and transportation; banners and flags.

Specific embodiments and applications of the present invention will now be discussed in detail by reference to the accompanying example. This discussion is in no way intended to limit the scope of the invention.

THE EXAMPLES

Example 1

A sound absorption test was performed on two samples of 25 mm thick acoustic foam, one with 0.18 mm facing of the invention and one without any facing. To determine the sound absorption coefficient of the samples, the procedure was performed using the AS ISO 354-2006 "Acoustics: Measurement of sound absorption in a reverberation room" test.

The frequency range measured using this procedure was from 100 Hz to 5000 Hz in ⅓ octave increments.

Sample A comprised a 25 mm thick acoustic hydrolysis resistant polyurethane foam with a 0.18 mm thick non-combustible sound absorbing facing. Sample A had a nominal density of 28 kg/m3 and a nominal thickness of 25 mm.

Sample B comprised a 25 mm thick acoustic hydrolysis resistant polyurethane foam. Sample B had a nominal density of 28 kg/m3 and a nominal thickness of 25 mm.

The results are shown in Table 1

TABLE 1

Results of sound absorption tests and Noise Reduction Coefficient (NRC) for Sample A and Sample B.

| Frequency (Hz) | Sound Absorption Sample A: | Sound Absorption Sample B: |
| --- | --- | --- |
| 100 | 0.01 | 0.02 |
| 125 | 0.11 | 0.10 |
| 160 | 0.15 | 0.12 |
| 200 | 0.18 | 0.14 |
| 250 | 0.28 | 0.20 |
| 315 | 0.35 | 0.25 |
| 400 | 0.49 | 0.34 |
| 500 | 0.63 | 0.43 |

TABLE 1-continued

Results of sound absorption tests and Noise Reduction Coefficient (NRC) for Sample A and Sample B.

| Frequency (Hz) | Sound Absorption Sample A: | Sound Absorption Sample B: |
| --- | --- | --- |
| 630 | 0.74 | 0.45 |
| 800 | 0.81 | 0.50 |
| 1000 | 0.94 | 0.55 |
| 1250 | 1.01 | 0.57 |
| 1600 | 1.05 | 0.61 |
| 2000 | 1.05 | 0.65 |
| 2500 | 0.98 | 0.71 |
| 3150 | 0.90 | 0.70 |
| 4000 | 0.80 | 0.74 |
| 5000 | 0.76 | 0.76 |
| NRC | 0.72 | 0.45 |

The NRC of the samples was calculated in accordance with ASTM C423-90A.

The individual weighted sound absorption coefficient $\alpha_w$ of each sample was determined in accordance with AS ISO 11654-1997 "Acoustics: Sound Absorbers for Use in Buildings—Rating of sound absorption" for $\alpha_w=0.55\ (M,H)$     Sample A:

$\alpha_w=0.45\ (H)$     Sample B:

The Practical Sound Absorption Coefficients are shown in Table 2. These values were also determined in accordance with AS ISO 11654-1997.

TABLE 2

Practical Sound Absorption Coefficients for Sample A and Sample B.

| Frequency (Hz) | Practical Sound Absorption Coefficients Sample A | Practical Sound Absorption Coefficients Sample B |
| --- | --- | --- |
| 125 | 0.10 | 0.10 |
| 250 | 0.25 | 0.20 |
| 500 | 0.60 | 0.40 |
| 1000 | 0.90 | 0.55 |
| 2000 | 1.00 | 0.65 |
| 4000 | 0.80 | 0.75 |

Figure 2A:
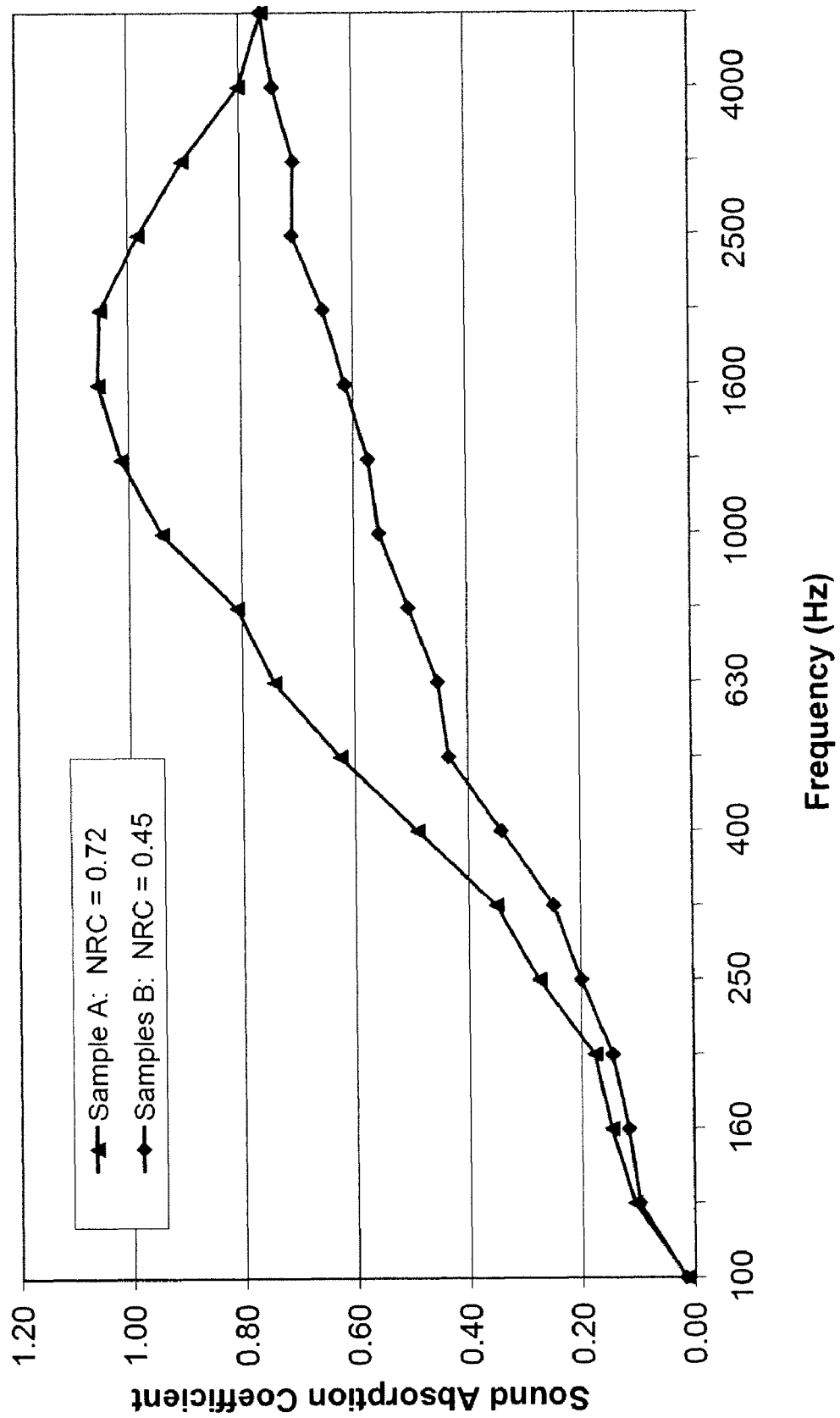
FIGS. 2A to 2D are graphs of sound-absorption coefficient vs frequency for various combinations of thickness and materials of standard substrates with or without the facing of the present invention bonded to it as described in Examples 1 to 4.

The results of the absorption tests of Sample A and B are shown in FIG. 2A

Example 2

A sound absorption test was performed on two samples of 25 mm thick acoustic polyester, one with 0.18 mm facing of the present invention and one without any facing. The sound absorption coefficient of each sample was determined using the AS ISO 354-2006 "Acoustics: Measurement of sound absorption in a reverberation room" test.

The frequency range measured using this procedure was from 100 Hz to 5000 Hz in ⅓ octave increments. Sample C comprised a 25 mm thick 100% thermally bonded acoustic polyester fibre blend with a 0.18 mm thick non-combustible sound-absorbing facing. Sample C had a nominal density of 32 kg/m3 and a nominal thickness of 25 mm.

Sample D comprised a 25 mm thick 100% thermally bonded acoustic polyester fibre blend. Sample D had a nominal density of 32 kg/m3 and a nominal thickness of 25 mm.

The results are shown in Table 3.

TABLE 3

Results of sound absorption tests and (NRC) values in Sample C and Sample D.

| Frequency (Hz) | Sound Absorption Sample C | Sound Absorption Sample D |
|---|---|---|
| 100 | 0.12 | 0.09 |
| 125 | 0.14 | 0.13 |
| 160 | 0.19 | 0.18 |
| 200 | 0.22 | 0.19 |
| 250 | 0.28 | 0.24 |
| 315 | 0.31 | 0.27 |
| 400 | 0.43 | 0.35 |
| 500 | 0.53 | 0.36 |
| 630 | 0.59 | 0.43 |
| 800 | 0.67 | 0.45 |
| 1000 | 0.79 | 0.46 |
| 1250 | 0.87 | 0.49 |
| 1600 | 0.98 | 0.55 |
| 2000 | 1.02 | 0.58 |
| 2500 | 1.00 | 0.59 |
| 3150 | 0.99 | 0.59 |
| 4000 | 0.90 | 0.62 |
| 5000 | 0.81 | 0.62 |
| NRC | 0.65 | 0.40 |

The NRC of the samples was calculated in accordance with ASTM C423-90A.

The individual weighted sound absorption coefficient $\alpha w$ of each sample was again determined in accordance with AS ISO 11654-1997:

$$\alpha_w = 0.50 \; (M,H) \quad \text{Sample C:}$$

$$\alpha_w = 0.45 \; (H). \quad \text{Sample D:}$$

The Practical Sound Absorption Coefficients are shown in Table 4. These values were again determined in accordance with AS ISO 11654-1997.

TABLE 4

Practical Sound Absorption Coefficients for Sample C and Sample D

| Frequency (Hz) | Practical Sound Absorption Coefficients Sample C | Practical Sound Absorption Coefficients Sample D |
|---|---|---|
| 125 | 0.15 | 0.15 |
| 250 | 0.25 | 0.25 |
| 500 | 0.50 | 0.40 |
| 1000 | 0.80 | 0.45 |
| 2000 | 1.00 | 0.55 |
| 4000 | 0.90 | 0.65 |

Figure 2B:
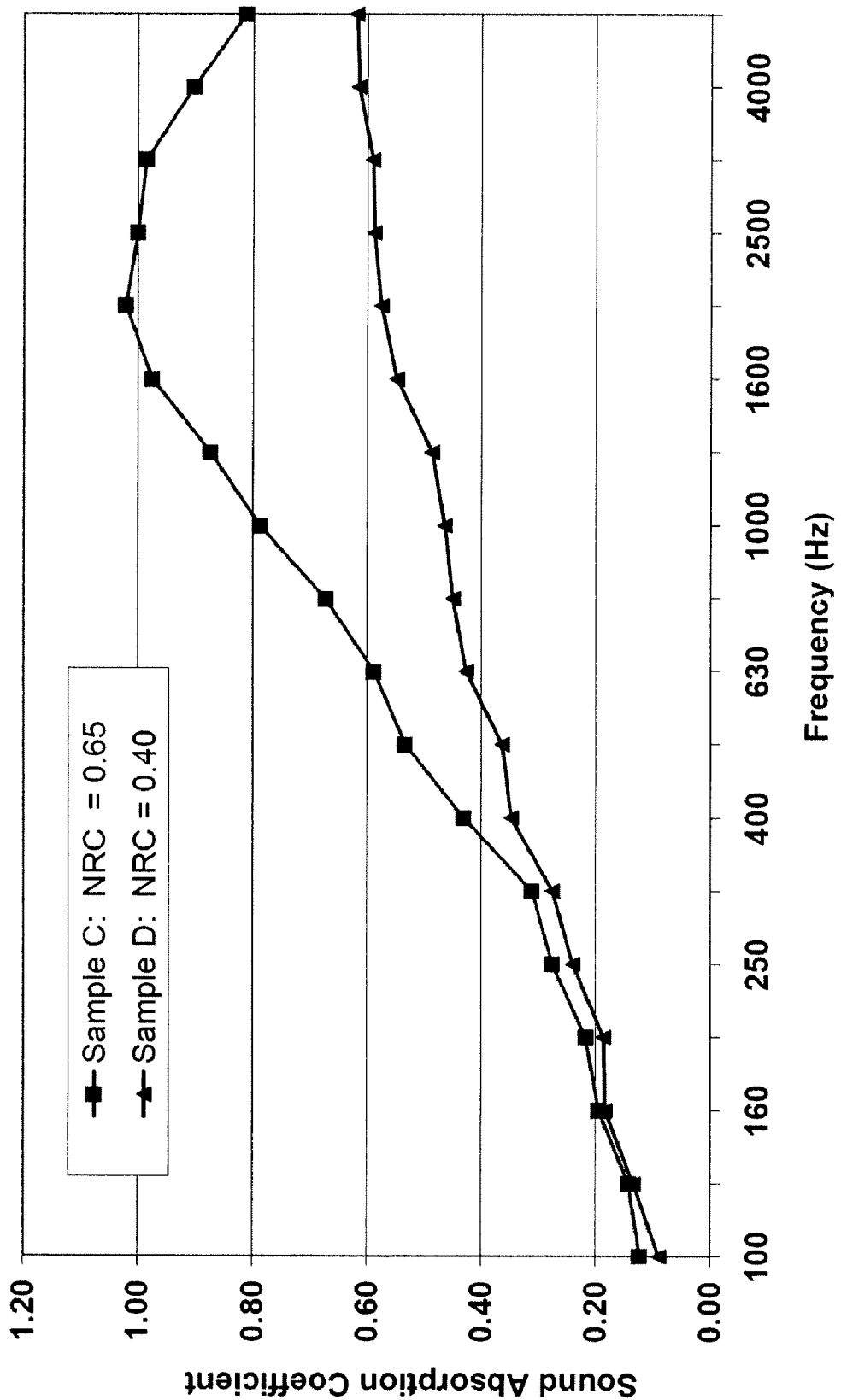

The results of the absorption tests of Sample C and D are shown in FIG. 2B

Example 3

A sound absorption test was performed on two samples of 50 mm thick acoustic polyester, one with 0.18 mm facing of the present invention and one without any facing. The sound absorption coefficient of each sample was determined using the AS ISO 354-2006 test.

The frequency range measured using this procedure was from 100 Hz to 5000 Hz in ⅓ octave increments.

Sample E comprised a 50 mm thick 100% thermally bonded acoustic polyester fibre blend with a 0.18 mm thick non-combustible sound-absorbing facing. Sample E had a nominal density of 32 kg/m3 and a nominal thickness of 50 mm.

Sample F was the same as Sample E except that it did not contain the facing.

The results are shown in Table 5.

TABLE 5

Results of sound absorption tests and (NRC) values in Sample E and Sample F.

| Frequency (Hz) | Sound Absorption Sample E | Sound Absorption Sample F |
|---|---|---|
| 100 | 0.25 | 0.20 |
| 125 | 0.30 | 0.22 |
| 160 | 0.45 | 0.33 |
| 200 | 0.47 | 0.37 |
| 250 | 0.69 | 0.54 |
| 315 | 0.83 | 0.62 |
| 400 | 1.03 | 0.77 |
| 500 | 1.14 | 0.85 |
| 630 | 1.17 | 0.88 |
| 800 | 1.17 | 0.85 |
| 1000 | 1.15 | 0.83 |
| 1250 | 1.12 | 0.85 |
| 1600 | 1.07 | 0.86 |
| 2000 | 1.00 | 0.86 |
| 2500 | 0.88 | 0.84 |
| 3150 | 0.85 | 0.85 |
| 4000 | 0.87 | 0.87 |
| 5000 | 0.89 | 0.89 |
| NRC | 1.00 | 0.77 |

The NRC of the samples was calculated in accordance with ASTM C423-90A.

The individual weighted sound absorption coefficient $\alpha_w$ of each sample was again determined in accordance with AS ISO 11654-1997:

$$\alpha_w = 0.95 \; (M,H) \quad \text{Sample E:}$$

$$\alpha_w = 0.80 \; (H) \quad \text{Sample D:}$$

The Practical Sound Absorption Coefficients are shown in Table 6. These values were again determined in accordance with AS ISO 11654-1997.

TABLE 6

Practical Sound Absorption Coefficients for Sample E and Sample F

| Frequency (Hz) | Practical Sound Absorption Coefficients Sample E | Practical Sound Absorption Coefficients Sample F |
|---|---|---|
| 125 | 0.35 | 0.25 |
| 250 | 0.65 | 0.50 |
| 500 | 1.15 | 0.85 |
| 1000 | 1.15 | 0.85 |
| 2000 | 1.00 | 0.85 |
| 3150 | 0.85 | 0.85 |

Figure 2C:
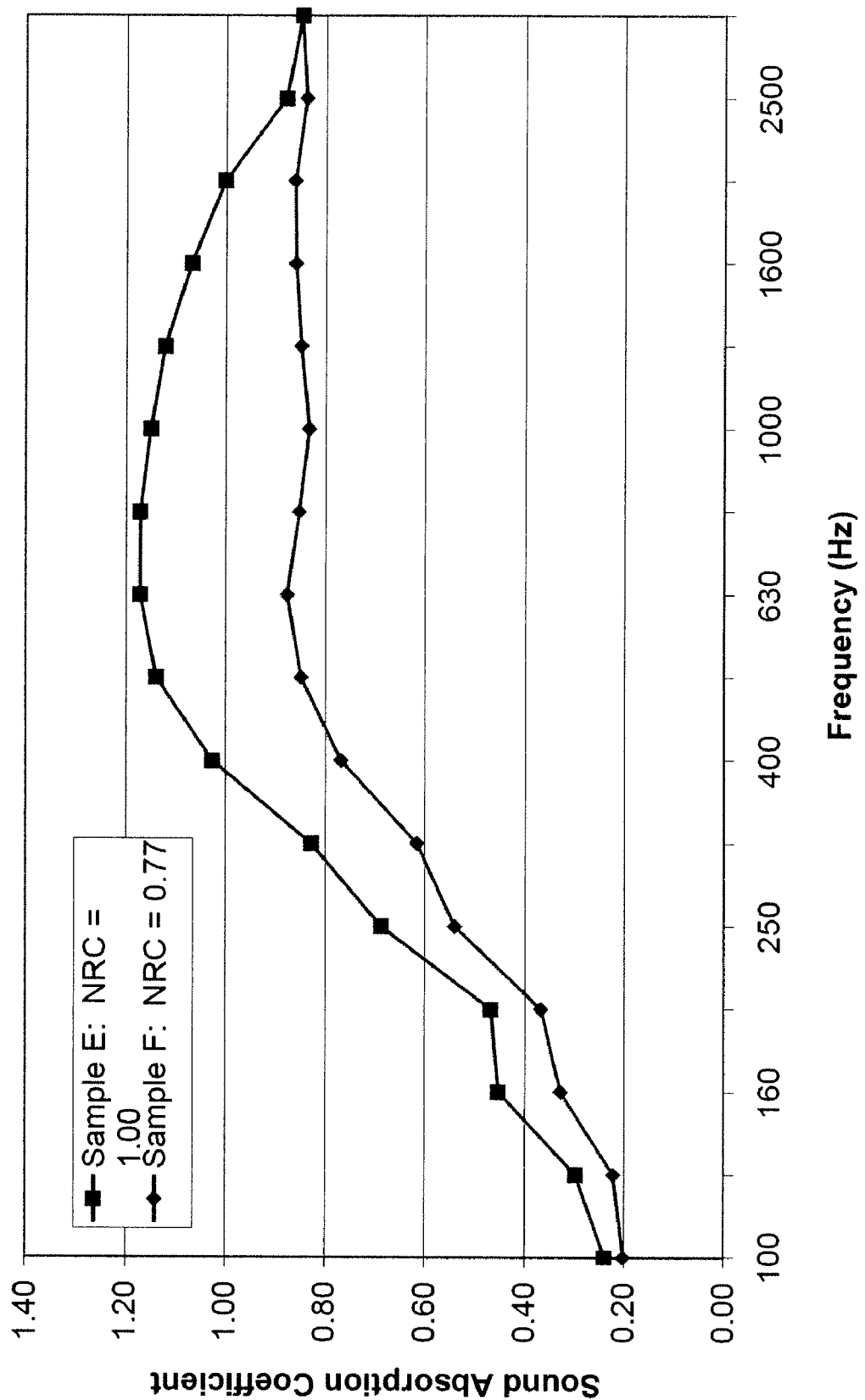

The results of the absorption tests of Sample E and F are shown in FIG. 2C.

Example 4

A sound absorption test was performed on two samples of 100 mm thick acoustic polyester, one with 0.18 mm facing of the present invention and one without any facing. The sound absorption coefficient of each sample was determined using the AS ISO 354-2006 test.

The frequency range measured using this procedure was from 100 Hz to 5000 Hz in ⅓ octave increments.

Sample G comprised a 100 mm thick 100% thermally bonded acoustic polyester fibre blend with a 0.18 mm thick non-combustible sound-absorbing facing. Sample G had a nominal density of 32 kg/m3 and a nominal thickness of 100 mm.

Sample H comprised a 100 mm thick thermally bonded acoustic polyester fibre and its nominal density and thickness were the same as Sample G.

The results are shown in Table 7.

TABLE 7

Results of sound absorption tests and (NRC) values in Sample G and Sample H.

| Frequency (Hz) | Sound Absorption Sample G | Sound Absorption Sample H |
|---|---|---|
| 100 | 0.60 | 0.4 |
| 125 | 0.57 | 0.50 |
| 160 | 0.93 | 0.70 |
| 200 | 1.00 | 0.80 |
| 250 | 1.20 | 1.00 |
| 315 | 1.15 | 1.05 |
| 400 | 1.24 | 1.10 |
| 500 | 1.19 | 1.10 |
| 630 | 1.10 | 1.10 |
| 800 | 1.10 | 1.10 |
| 1000 | 0.99 | 0.99 |
| 1250 | 0.92 | 0.92 |
| 1600 | 0.92 | 0.92 |
| 2000 | 0.99 | 0.99 |
| 2500 | 0.95 | 0.95 |
| 3150 | 0.96 | 0.96 |
| 4000 | 0.90 | 0.90 |
| 5000 | 0.89 | 0.89 |
| NRC | 1.10 | 1.09 |

The NRC of the samples was calculated in accordance with ASTM C423-90A.

The individual weighted sound absorption coefficient αw of each sample was again determined in accordance with AS ISO 11654-1997:

$\alpha_w = 1.0\ (M,H)$  Sample G:

$\alpha_w = 1.00\ (H)$  Sample H:

The Practical Sound Absorption Coefficients are shown in Table 6. These values were again determined in accordance with AS ISO 11654-1997.

TABLE 8

Practical Sound Absorption Coefficients for Sample G and Sample H

| Frequency (Hz) | Practical Sound Absorption Coefficients Sample G | Practical Sound Absorption Coefficients Sample H |
|---|---|---|
| 125 | 0.57 | 0.55 |
| 250 | 1.20 | 1.00 |
| 500 | 1.20 | 1.10 |
| 630 | 1.10 | 1.10 |

Figure 2D:
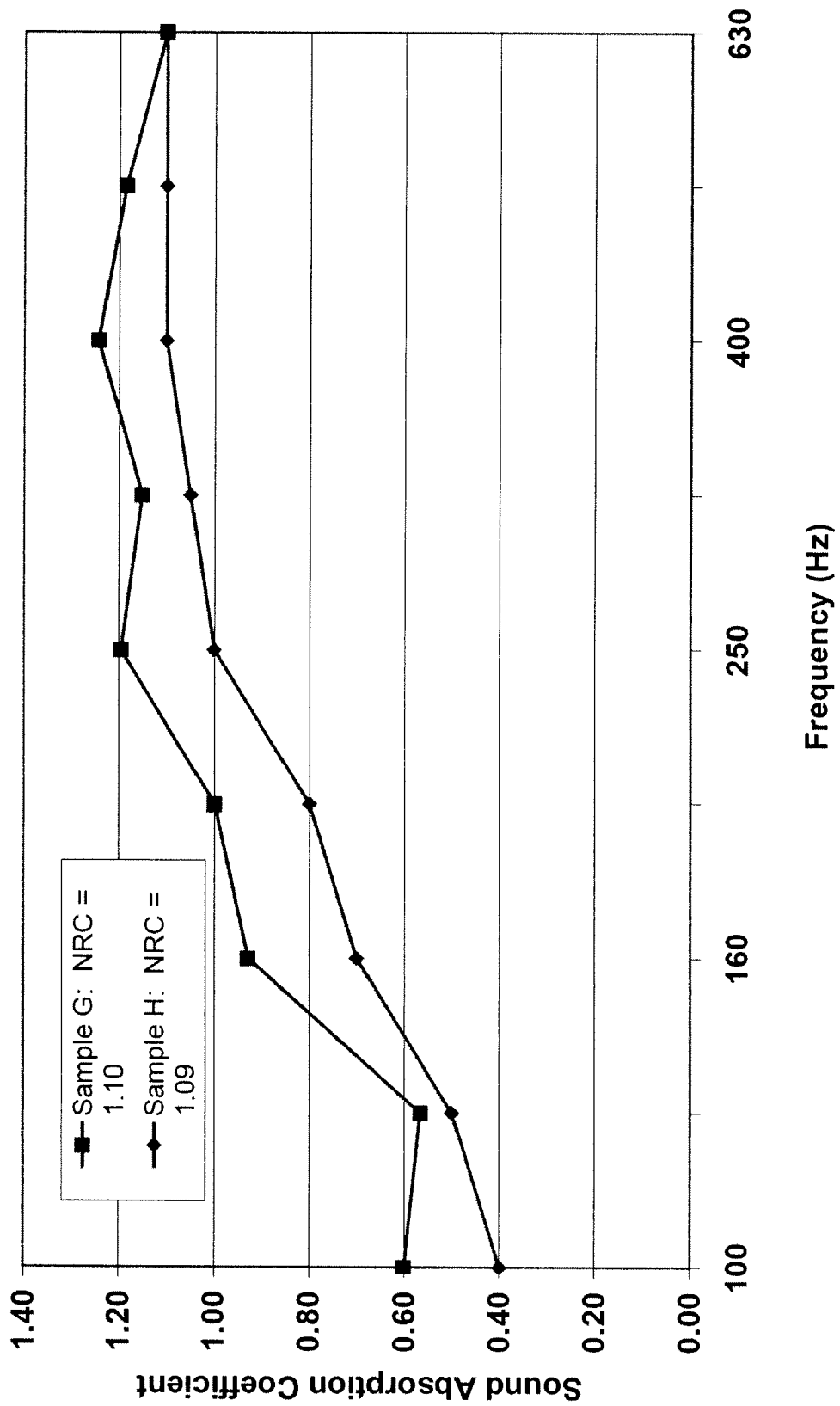

The results of the absorption tests of Sample G and H are shown in FIG. 2D.

Example 5

A Fire test was performed on Samples A and B of Example 1. The flammability test was conducted according to AS1530.3-1999: While this test can produce results on Ignitability, Flame Propagation, Heat Release and Smoke Release, it is the ignitability or combustibility value of each Sample which is of importance in the present invention.

Ignitability is determined using a scale of from 0 to 20 where 0 is read as the tested material will not ignite.

The results are shown in Table 9.

TABLE 9

| Sample | Ignitability |
|---|---|
| Sample A | 0 |
| Sample B | 17 |

Accordingly, the presence of the facing has rendered a substrate that previously had an ignitability of 17 down to zero.

Example 6

The same Fire test as employed in Example 5 was conducted on Samples C and D of Example 2.

Sample D gave an ignitability value of 8 while Sample C which contained the 0.18 mm facing on the 25 mm thick acoustic polyester had a value of zero and would not ignite.

Thus again the presence of the facing of the present invention enhanced the ability of a standard substrate material (25 mm polyester) to withstand combustibility.

The Examples and FIGS. 2A to 2D demonstrate that a substantial sound absorption improvement is achieved by adding the facing of the present invention to a conventional sound absorbing substrate.

Further, since the facing is non-combustible a safer sound-absorbing noise insulator can surround potentially hazardous equipment. The facing of the present invention has successfully transformed earlier flammable sound absorbing materials into non-combustible and thus safer acoustic systems.

When a Markush group or other grouping is used herein, all individual members of the group and all combinations and subcombinations possible of the group members are intended to be individually included in the disclosure. Every combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

Where the terms "comprise", "comprises", "comprised" or "comprising" are used in this specification, they are to be interpreted as specifying the presence of the stated features, integers, steps or components referred to, but not to preclude the presence or addition of one or more other feature, integer, step, component or group thereof. As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. The broad term "comprising" is intended to encompass the narrower "consisting essentially of" and the even narrower "consisting of." Thus, in any recitation herein of a phrase "comprising one or more claim element" (e.g., "comprising A), the phrase is intended to encompass the narrower, for example, "consisting essentially of A" and "consisting of A" Thus, the broader word "comprising" is intended to provide specific support in each use herein for either "consisting essentially of" or "consisting of."

The invention illustratively described herein suitably may be practiced in the absence of any element or elements, limitation or limitations which is not specifically disclosed herein.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention. Various modifications and equivalent arrangements are intended to be included within the spirit and scope of the invention.

One of ordinary skill in the art will appreciate that materials and methods, other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by examples, preferred embodiments and optional features, modification and variation of the concepts herein disclosed may be resorted to by those skilled in the art, and that such modifications and variations are considered to be within the scope of this invention as defined by the appended claims.

Each reference cited herein is incorporated by reference herein in its entirety. Such references may provide, among other information, sources of materials, alternative materials, details of methods, as well as additional uses of the invention.

The invention claimed is:

1. A sound-absorbing facing in the form of a non-combustible woven or knitted fabric having an air flow resistivity of between 80 and 3,000 Rayls and a weight per unit area of between 20 and 1,000 g/m$^2$.

2. The facing according to claim 1, wherein the fabric comprises glass wool, glass yarn, glass fibre, ceramic wool, ceramic yarn, ceramic fibre, rock wool, rock yarn, rock fibre; or mixtures thereof.

3. The facing according to claim 2, wherein the facing has a thickness of between 0.1 and 3.0 mm.

4. The facing according to claim 3, wherein the facing has a thickness between 0.12 and 1.5 mm.

5. The facing according to claim 3, wherein the fabric is formed from yarn, and wherein the yarn has a diameter of between 3 and 500 microns.

6. The facing according to claim 5, wherein the diameter of the yarn is between 6 to 150 micron.

7. The facing according to claim 1, wherein the fabric is treated to increase its fire rating.

8. The facing according to claim 5 wherein the yarn is treated to increase its fire rating.

9. The facing according to claim 1 having a weight per unit area between 80 and 300 g/m$^2$.

10. The facing according to claim 9, wherein the weight per unit area is around 200 g/m$^2$.

11. The facing according to claim 1 wherein the air flow resistivity is about 1,000 Rayls.

12. A sound-absorbing laminate comprising:
(a) a sound-absorbing facing in the form or a non-combustible woven or knitted fabric having an air flow resistivity of between 80 and 3,000 Rayls and a weight per unit area of between 20 and 1,000 g/m$^2$ and
(b) a substrate;
wherein superimposing the facing on the substrate forms the laminate having good sound absorbing characteristics.

13. The laminate according to claim 12, wherein the facing is affixed to the substrate.

14. The laminate according to claim 12, wherein the facing is affixed to the substrate and the affixing of the facing to the substrate is by flame lamination.

15. The laminate according to claim 12, wherein the facing is adhered to a face of the substrate.

16. The laminate according to claim 12, wherein the facing is adhered to a face of the substrate and the adhesion of the facing to the substrate is by adhesive bonding via an adhesive layer positioned between the facing and the substrate.

17. The laminate according to claim 12, wherein the substrate is comprised of a material selected from an acoustic foam or an air-permeable material.

18. The facing according to claim 2 wherein the fabric consists of glass wool, glass yarn, glass fibre, ceramic wool, ceramic yarn, ceramic fibre, rock wool, rock yarn, rock fibre; or mixtures thereof.

19. The facing according to claim 1 wherein the fabric has a coating.

20. The facing according to claim 1 wherein the fabric is treated with a colorant.

21. The facing according to claim 1 in which an image is applied to the fabric.

22. The laminate according to claim 12 wherein the fabric has a coating.

23. The laminate according to claim 12 wherein the fabric is treated with a colorant.

24. The laminate according to claim 12 in which an image is applied to the fabric.

25. A sound-absorbing facing in the form of a non-combustible woven or knitted fabric having an air flow resistivity of between 80 and 3,000 Rayls, a weight per unit area of between 20 and 1,000 g/m$^2$ and thickness of 0.1 to less than 1 mm.

26. The sound-absorbing facing of claim 25 having thickness of 0.1 to 0.5 mm.

27. The sound-absorbing facing of claim 25 wherein the air flow resistivity is between 1,000 and 3,000 Rayls and the weight per unit area is less than 300 g/m$^2$.

* * * * *

UNITED STATES PATENT AND TRADEMARK OFFICE
CERTIFICATE OF CORRECTION

| | |
|---|---|
| PATENT NO. | : 8,167,085 B2 |
| APPLICATION NO. | : 12/537968 |
| DATED | : May 1, 2012 |
| INVENTOR(S) | : Harvey Hui-Xiong Law |

It is certified that error appears in the above-identified patent and that said Letters Patent is hereby corrected as shown below:

In (Col. 12, line 10), please replace "in the form or a non-combustible" with --in the form of a non-combustible--.

Signed and Sealed this
Eleventh Day of September, 2012

David J. Kappos
*Director of the United States Patent and Trademark Office*